US011392153B2

(12) United States Patent
Chen et al.

(10) Patent No.: US 11,392,153 B2
(45) Date of Patent: Jul. 19, 2022

(54) POWER CONVERTER IMPLEMENTATIONS, PROGRAMMABLE GAIN, AND PROGRAMMABLE COMPENSATION

(71) Applicant: Infineon Technologies Austria AG, Villach (AT)

(72) Inventors: Keng Chen, Sudbury, MA (US); Luca Petruzzi, Andover, MA (US)

(73) Assignee: Infineon Technologies Austria AG, Villach (AT)

( * ) Notice: Subject to any disclaimer, the term of this patent is extended or adjusted under 35 U.S.C. 154(b) by 12 days.

(21) Appl. No.: 16/783,522

(22) Filed: Feb. 6, 2020

(65) Prior Publication Data

US 2021/0247788 A1 Aug. 12, 2021

(51) Int. Cl.
G05F 1/46 (2006.01)
G05F 1/575 (2006.01)
G05F 1/613 (2006.01)
H02M 3/158 (2006.01)

(52) U.S. Cl.
CPC .............. *G05F 1/468* (2013.01); *G05F 1/613* (2013.01); *H02M 3/158* (2013.01); *G05F 1/575* (2013.01)

(58) Field of Classification Search
CPC ................................ G05F 1/468; G05F 1/575
USPC ................ 323/274, 280, 281, 284, 313, 314
See application file for complete search history.

(56) References Cited

U.S. PATENT DOCUMENTS

| 4,264,858 | A  | * | 4/1981  | Archer .................... H01T 19/00 323/280 |
| 8,188,723 | B2 | * | 5/2012  | Piselli ............... H02M 3/33507 323/285 |
| 9,915,963 | B1 | * | 3/2018  | Wu .......................... G05F 1/575 |
| 2010/0253431 | A1 | * | 10/2010 | Fujiwara ................. G05F 1/575 330/253 |
| 2015/0035503 | A1 | * | 2/2015  | Tan ....................... H02M 3/158 323/271 |
| 2015/0077078 | A1 | * | 3/2015  | Hsu ....................... H02M 3/156 323/282 |
| 2016/0248381 | A1 | * | 8/2016  | Yang ..................... H03F 1/0227 |
| 2018/0351452 | A1 | * | 12/2018 | Clavette ............... H02M 3/158 |

FOREIGN PATENT DOCUMENTS

EP 3534518 A1 9/2019

OTHER PUBLICATIONS

Extended Search Report, EP 21154749.2, dated Jun. 18, 2021, pp. 1-10.
Liu, Pei-Hsin et al., "Digital Constant On-Time V2 Control with Hybrid Capacitor Current Ramp Compensation", IEEE Transactions on Power Electronics, Institute of Electrical and Electronics Engineers, USA, vol. 33, No. 10, Oct. 1, 2018, pp. 8818-8826, XP011687232.

* cited by examiner

*Primary Examiner* — Gary A Nash
(74) *Attorney, Agent, or Firm* — Armis IP Law, LLC

(57) ABSTRACT

A power supply includes a voltage converter to produce an output voltage to power a load. The power supply further includes a reference voltage generator and a controller. The reference voltage generator is operative to generate a floor reference voltage that varies as a function of the output voltage depending on a setting of one or more adjustable (programmable) resistor-capacitor paths in the floor reference voltage generator. The controller produces control signals to control the voltage converter as a function of the floor reference voltage and the output voltage.

36 Claims, 10 Drawing Sheets

POWER CONVERTER IMPLEMENTATIONS, PROGRAMMABLE GAIN, AND PROGRAMMABLE COMPENSATION

BACKGROUND

Conventional power supplies may include one or more DC-to-DC converters to produce a respective output voltage to power a load. One type of DC-to-DC converter is a single-stage power converter system. As its name suggests, in the single-stage power converter system, each phase includes a single power converter to convert an input voltage such as 12 VDC (Volts Direct Current) into a respective target output voltage such as 1 volt DC to power a load.

If desired, a conventional power converter can be configured to operate in a so-called diode emulation mode in which high side switch circuitry is occasionally pulse to an ON state to maintain regulation of an output voltage while corresponding low side switch circuitry is always disable (OFF). Additionally, a conventional power converter can be configured to operate in a so-called continuous conduction mode in which high side switch circuitry and low side switch circuitry are activated at different times.

Thus, in general, to maintain an output voltage within a desired range, the buck converter compares the magnitude of a generated output voltage to control respective switch circuitry (such as a control switch and synchronous switch).

BRIEF DESCRIPTION

Embodiments herein include novel ways of improving an efficiency and accuracy of generating an output voltage.

More specifically, a power supply (such as an apparatus, device, system, etc.) includes a voltage converter to produce an output voltage to power a load. The power supply further includes a floor reference voltage generator and a controller. During operation, the floor reference voltage generator generates a floor reference voltage that varies as a function of the output voltage as well as a setting of one or more adjustable resistor-capacitor paths disposed in the floor reference voltage generator. The controller produces control signals (a.k.a., control output) to control the voltage converter as a function of the floor reference voltage and the output voltage.

In accordance with further example embodiments, the power supply as described herein includes a ramp voltage generator. The reference voltage generator produces a ramp voltage. In one embodiment, the ramp voltage is offset by a magnitude of the floor reference voltage. The controller produces the control output (one or more control signals) based on a comparison of the output voltage and the offset ramp voltage.

In yet further example embodiments, the floor reference voltage generator includes a floor reference voltage amplifier operative to produce the floor reference voltage. An adjustable resistor-capacitor path is disposed in a feedback path of the floor reference voltage amplifier. In one embodiment, the adjustable resistor-capacitor path in the feedback path of the floor reference voltage generator controls a gain such as an AC (Alternating Current) gain of the floor reference voltage amplifier. Thus, variations in the adjustable resistor-capacitor path results in variations to the corresponding gain provided by the adjustable resistor-capacitor path.

In still further example embodiments, the floor reference voltage generator includes a floor reference voltage amplifier that produces the floor reference voltage. In such an instance, the adjustable resistor-capacitor path is disposed in a circuit path between an output of a sense amplifier stage and an input of the floor reference voltage amplifier. In one embodiment, the sense amplifier stage compares the output voltage to a reference voltage. Based on the comparison, the sense amplifier generates an error voltage signal (which may be offset with respect to ground). The sense amplifier inputs the respective generated error voltage signal into the circuit path (adjustable resistor-capacitor path) to the floor reference voltage amplifier. In one embodiment, the adjustable resistor-capacitor path provides a zero to the reference voltage generator circuit for stability of the power supply. A setting of the adjustable resistor-capacitor path (such as RC value) provides a setting of a zero associated with the floor reference voltage generator.

In accordance with further embodiments, the adjustable resistor-capacitor path provides phase margin compensation to the floor reference voltage generator. In other words, a programmed setting of the adjustable resistor-capacitor path controls a phase response of the floor reference voltage generator.

Note that the one or more adjustable resistor-capacitor paths in the floor reference voltage generator can be implemented in any suitable manner.

For example, in one embodiment, the adjustable resistor-capacitor path (such as a first adjustable resistor-capacitor path of multiple adjustable resistor-capacitor paths in the power supply) includes a capacitor ladder (multiple capacitors). The power supply further includes a first RC (resistor-capacitor) path controller that, while the resistor is set to fixed resistor value, controls a capacitance of the capacitor ladder in the adjustable resistor-capacitor path to a desired capacitance setting. In such an instance, the first RC path controller selects how many of the one or more capacitors of the capacitor ladder are connected in parallel or series depending on a respective control signal inputted to the capacitor ladder. Via changes in the number of capacitors of the capacitor ladder that are connected in parallel or series, the first RC path controller controls a capacitance setting and the overall RC setting of the first adjustable resistor-capacitor path and thus corresponding circuit behavior (phase response and gain response) associated with the floor reference voltage generator.

In an example embodiment, the adjustable resistor-capacitor path (such as a second adjustable resistor-capacitor path of multiple adjustable resistor-capacitor paths in the power supply) includes a resistor ladder (multiple resistors). The power supply further includes a second RC (resistor-capacitor) path controller that, while the capacitor is controlled to a fixed capacitor value, controls a resistance of the resistor ladder in the second adjustable resistor-capacitor path to a desired resistor setting. The second RC path controller selects how many of the one or more resistors of the resistor ladder are connected in parallel or series depending on a respective control signal inputted to the resistor ladder. Via changes in the number of resistors of the resistor ladder that are connected in series or parallel, the second RC path controller controls a resistance setting and thus overall RC setting of the adjustable resistor-capacitor path and corresponding circuit attributes associated with the floor reference voltage generator.

In accordance with further example embodiments, the adjustable resistor-capacitor path receives a ripple voltage (such as from a sense amplifier stage) and provides a zero compensation to a floor reference voltage amplifier in the floor reference voltage generator.

Further embodiments herein include implementing multiple (programmable) adjustable resistor-capacitor paths in the power supply to provide improved generation of an output voltage of different operational conditions (such as steady state conditions and transient conditions). For example, in one embodiment, the power supply as described herein includes a first adjustable resistor-capacitor path and a second adjustable resistor-capacitor path. The reference voltage generator further includes a floor reference voltage amplifier that produces the floor reference voltage. The first adjustable resistor-capacitor path is a first adjustable resistor-capacitor path disposed in a feedback path of the floor reference voltage amplifier. In a manner as previously discussed, selected settings of the first adjustable resistor-capacitor path controls an AC (Alternating Current) gain response of the floor reference voltage amplifier. Selected settings of the second adjustable resistor-capacitor path provide a setting of a zero circuit associated with the floor reference voltage generator.

In yet further example embodiments, the setting of each of the one or more adjustable resistor-capacitor paths is automatically tuned by a digital state machine based on one or more of: i) a selected switching frequency, ii) an output current of the voltage converter, and iii) a measured temperature.

Embodiments herein are useful over conventional techniques. For example, the implementation of programming one or more adjustable resistor-capacitor paths as described herein is a unique way to implement compensation in the power supply circuit as described herein.

These and other more specific embodiments are disclosed in more detail below.

Note that techniques as discussed herein can be implemented in any suitable environment such as amplifier circuitry, power supplies, power converters, multi-phase power supply applications, single phase point of load (a.k.a., POL) power supply applications, etc.

Note further that although embodiments as discussed herein are applicable to multi-phase power supply circuits such as those implementing buck converters, DC-DC converter phases, the concepts disclosed herein may be advantageously applied to any other suitable topologies as well as general power supply control applications.

Additionally, note that embodiments herein can include computer processor hardware (that executes corresponding switch instructions) to carry out and/or support any or all of the method operations disclosed herein. In other words, one or more computerized devices or processors (computer processor hardware) can be programmed and/or configured to operate as explained herein to carry out different embodiments of the invention.

Yet other embodiments herein include software programs to perform the steps and operations summarized above and disclosed in detail below. One such embodiment comprises a computer program product that has non-transitory computer-storage media (e.g., memory, disk, flash, . . . ) including computer program instructions and/or logic encoded thereon that, when performed in a computerized device having a processor and corresponding memory, programs the processor to perform any of the operations disclosed herein. Such arrangements are typically provided as software instructions, code, and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), circuit logic, etc. The software or firmware or other such configurations can be installed onto a respective controller circuit to cause the controller circuit (such as logic) to perform the techniques explained herein.

Accordingly, one embodiment of the present disclosure is directed to a computer program product that includes a computer readable medium having instructions stored thereon for supporting conversion of a DC input voltage into a DC output voltage. For example, in one embodiment, the instructions, when carried out by computer processor hardware (one or more computer devices, control logic, digital circuitry, etc.), cause the computer processor hardware to: produce an output voltage to power a load; generate a floor reference voltage that varies as a function of the output voltage and depending on a setting of an adjustable resistor-capacitor path; and produce control output to control the voltage converter as a function of the floor reference voltage and the output voltage.

The ordering of the operations has been added for clarity sake. The operations can be performed in any suitable order.

It is to be understood that the system, method, device, apparatus, logic, etc., as discussed herein can be embodied strictly as hardware (such as analog circuitry, digital circuitry, logic, etc.), as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
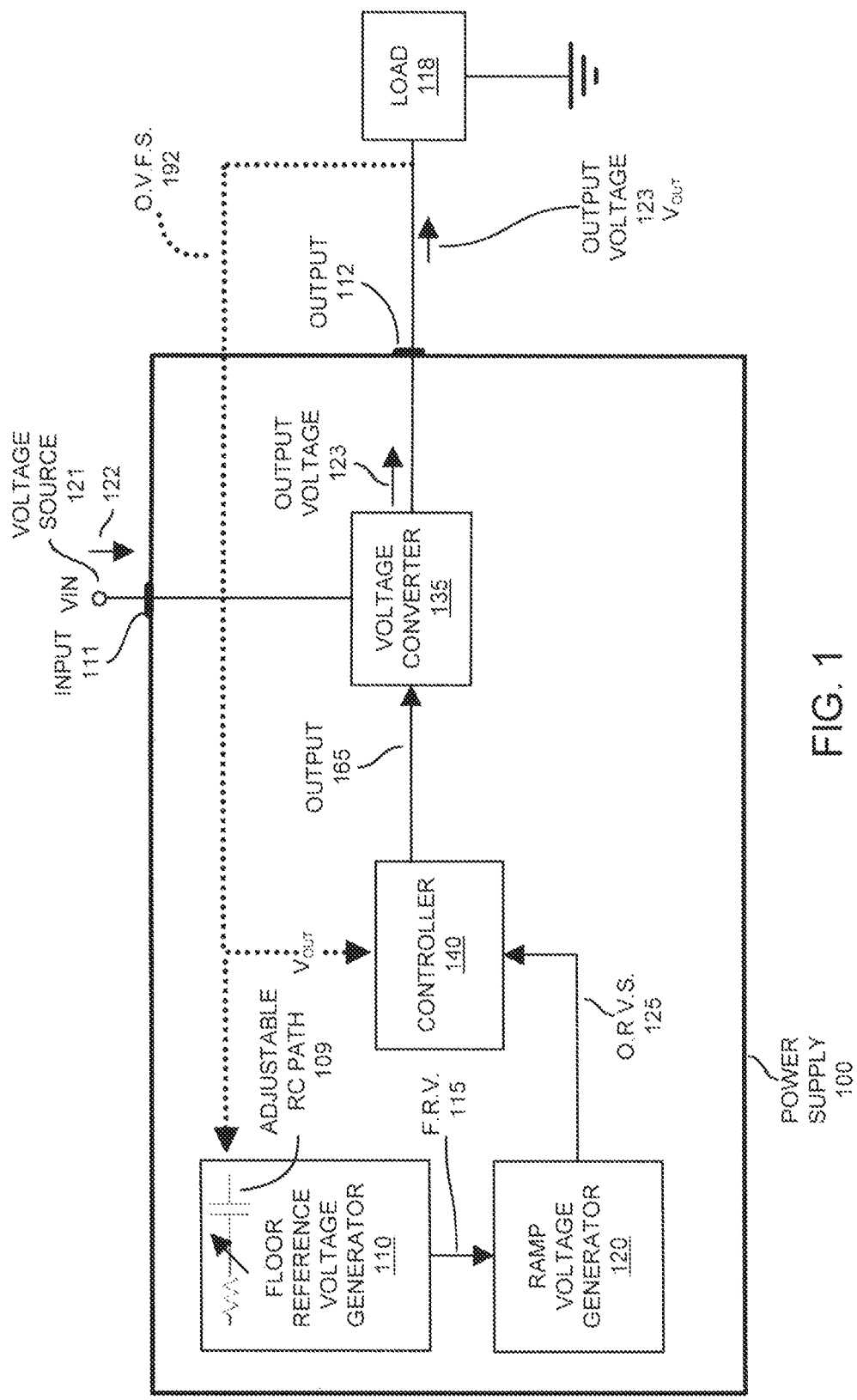
FIG. 1 is an example diagram illustrating a power supply including one or more adjustable resistor-capacitor paths disposed in a floor reference voltage generator according to embodiments herein.

The foregoing and other objects, features, and advantages of embodiments will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to example embodiments, a power supply (a.k.a., apparatus) such as a DC-DC power converter includes a voltage converter to produce an output voltage to power a load. The power supply further includes a reference voltage generator and a controller. During operation, the reference voltage generator generates a floor reference voltage, a magnitude of which varies as a function of the output voltage and settings of one or more adjustable resistor-capacitor paths (such as a zero circuit, gain control circuit, etc.) in the floor reference voltage generator. The controller produces control signals to control the voltage converter as a function of the floor reference voltage and the output voltage.

Now, more specifically, FIG. 1 is an example diagram illustrating a power supply including one or more adjustable resistor-capacitor paths according to embodiments herein.

As shown, the power supply 100 (such as an apparatus, hardware, device, system, circuitry, etc.) includes components such as floor reference voltage generator 110, ramp voltage generator 120, controller 140, and voltage converter 135. Floor reference voltage generator 110 includes one or more programmable adjustable resistor-capacitor paths 109 to control a behavior (such as phase and gain response) of the floor reference voltage generator 110.

During operation, the reference voltage generator 110 generates a floor reference voltage 115. A magnitude of the floor reference voltage 115 varies as a function of the output voltage 123 (or output voltage feedback signal 192 derived from the output voltage 123) and settings of the one or more adjustable resistor-capacitor paths 109 in the floor reference voltage generator 110.

The floor reference voltage generator 110 outputs the floor reference voltage 115 to the ramp voltage generator 120. As its name suggests, the ramp voltage generator 120 produces the offset ramp voltage signal 125, which is a ramp voltage that is offset by the floor reference voltage 115. In one embodiment, when magnitude of the floor reference voltage varies, an offset of the ramp voltage signal with respect to ground varies.

As further shown, the controller 140 receives the offset ramp voltage signal 125 produced by the ramp voltage generator 120 and the output voltage feedback signal 192. The controller 140 produces the control output 165 (output such as one or more control signals) based on a comparison of the output voltage feedback signal 192 and the offset ramp voltage signal 125. As previously discussed, the output voltage feedback signal 192 can be any suitable voltage such as the output voltage 123 or a voltage derived from the output voltage 123.

Thus, embodiments herein include a controller 140 that produces control output 165 (i.e., control output such as one or more signals) to control the voltage converter 135. The controller 140 generates the control signals 105 as a function of the floor reference voltage 115 and a magnitude of the output voltage 123.

Note further that the voltage converter 135 receives input voltage 122 from the input 111 of the power supply 100. As further shown, the voltage converter 135 converts the received input voltage 122 from input voltage source 121 into the output voltage 123 based on generated control output 165. Output voltage 123 is outputted from the output 112 and powers the load 118.

As previously discussed, and as further discussed herein, the floor reference voltage generator 110 can include one or more adjustable resistor-capacitor paths 109; the programmed settings of the one or more adjustable resistor-capacitor paths 109 control a behavior of the floor reference voltage generator 110 and generation of the floor reference voltage 115. In one embodiment, the selected settings of the one or more adjustable resistor-capacitor paths 109 improve a respective recovery time of generating the output voltage 123 within a desired voltage range subsequent to a transient load condition in which the load 118 suddenly consumes more or less current.

Figure 2:
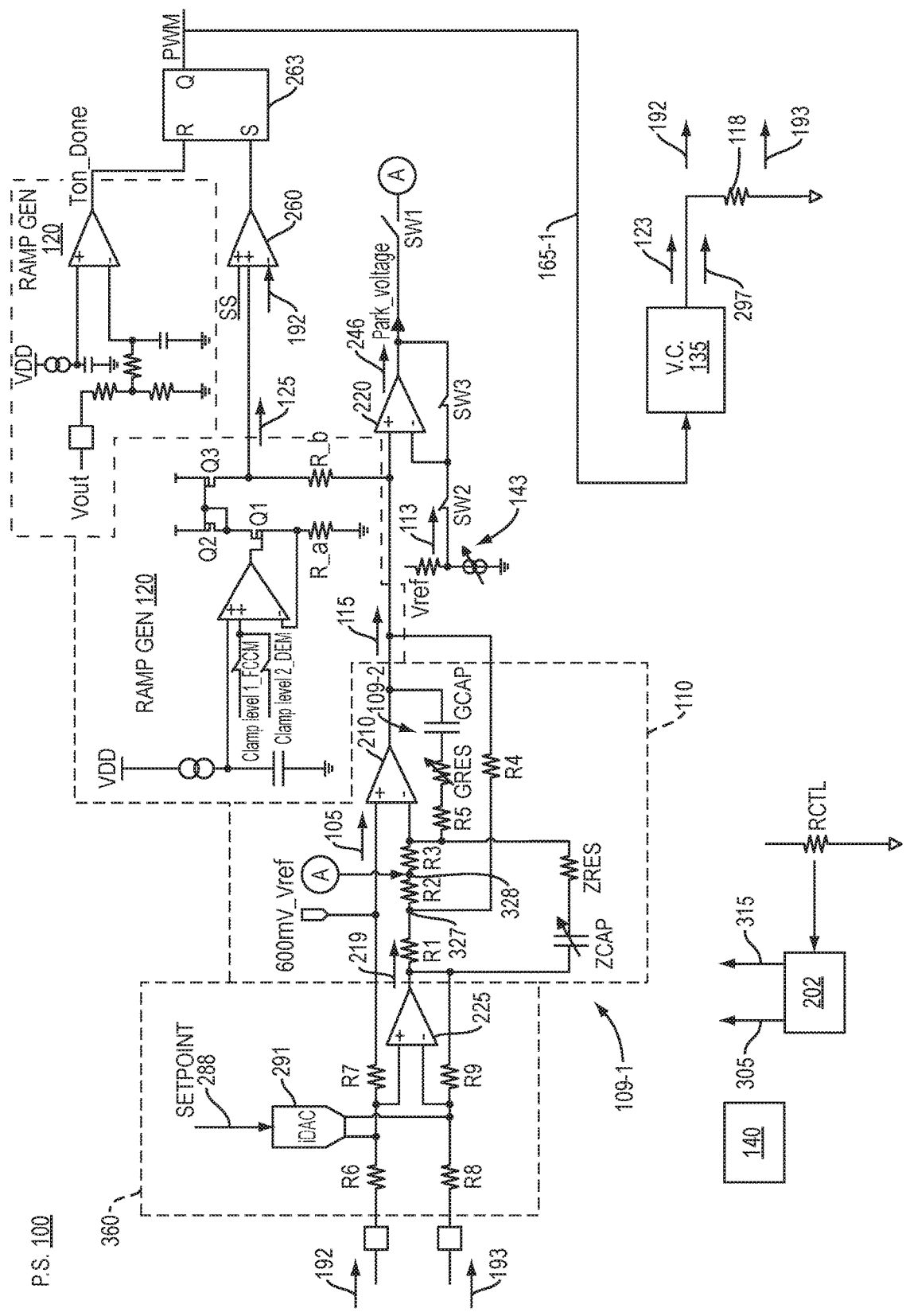
FIG. 2 is an example diagram illustrating a power supply and implementation of multiple adjustable resistor-capacitor paths in a power supply according to embodiments herein.

FIG. 2 is an example diagram illustrating a power supply and implementation of multiple adjustable resistor-capacitor paths according to embodiments herein.

Note that the power supply 100 as discussed herein can be configured to include a controller 140 that controls switching of the power supply between different operational modes. For example, the controller 140 initiates (via control of switches SW1, SW2, and SW3) switching between operating the power supply 100 in a continuous conduction mode versus a discontinuous conduction mode (such as diode emulation mode).

During the diode emulation mode, the controller 140 enables (via closing or shorting of switches SW1 and SW3 and opening of switch SW2) the reference generator 143 to control a magnitude of the floor reference voltage 115 (based on floor reference voltage 115 being generated by the reference generator 143). For example, in this mode, the non-inverting input of amplifier 220 receives the reference voltage 113 from reference generator 143.

Conversely, in the continuous conduction mode, the mode controller 140 enables (via opening switches SW1 and SW3 and closing or shorting switch SW2) the floor reference voltage generator circuit 210 and input from sense amplifier 360 to control the magnitude of the floor reference voltage 115. In such an instance, a magnitude of the floor reference voltage 115 varies during non-steady state conditions for driving the load 118. In one embodiment, during steady state conditions, the magnitude of the floor reference voltage 115 is around 550 mVDC, although this can vary depending on the embodiment.

In one nonlimiting example embodiment, the output voltage feedback signal 192 and the floor reference voltage 115

(or offset ramp voltage signal 125) are compared to one another directly via amplifier 260 to generate the control output 165, optionally also with a soft-startup voltage signal 195 during a soft-startup of the device. Advantageously, this configuration is implemented when the output voltage feedback signal 192 includes a ripple voltage component.

As further discussed below, the control output 165 (such as one or more control signals) is used as a basis to control voltage converter 135 (such as a one or more switching phases of power supply 100) for producing the output voltage 123. In other words, based on control output 165 (such as pulse width modulation control information), the voltage converter 135 produces the output voltage 123 to power the respective load 118.

Further in this example embodiment, note that the sense amplifier 360 receives, as input, the output voltage feedback signal 192 and ground reference signal 193 (such as true output voltage 123 at the load 118) to produce an error signal which drives the input (such as resistor R1) of floor reference voltage generator 110.

At steady state (when the magnitude of the output voltage 123 is equal to the setpoint voltage as controlled by the setpoint generator 291), the magnitude of the signal 219 from the amplifier 225 is zero volts (or a steady 600 mVDC offset voltage). Perturbations in the magnitude of the output voltage 123 with respect to the desired setpoint causes the signal 219 to be greater than or less than the 600 mVDC value.

As further shown in the non-limiting example embodiment of FIG. 2, the floor reference voltage generator 110 includes amplifier 210 and a configuration of resistors R1, R2, and R3 in series between the output of amplifier 225 and the inverting input node of the amplifier 210. Resistors GRES, R5, as well as capacitor GCAP reside in series in a feedback path (adjustable resistor-capacitor path 109-2) between the output of amplifier 210 and the inverting input of the amplifier 210.

The floor reference voltage generator 110 is configured to include a first (outer) gain path (such as combination of resistors R1 and R4) for DC signal gain and a second (inner) gain path (resistors R1 and R2, R3, R5, resistor GRES and capacitor GCAP) for AC signal gain. As previously discussed, the adjustable resistor-capacitor path 109-2 can be programmed to provide any suitable AC gain applied to received signal 219.

Floor reference voltage generator 210 further includes adjustable resistor-capacitor path 109-1 including a series connectivity of capacitor ZCAP and resistor ZRES between the output of the amplifier 225 and the inverting input node of the amplifier 210.

In this example embodiment, the first gain path (R1 and R4) provides DC (Direct Current) gain of $-R4/R1$; the second gain path provides AC (Alternating Current) gain– $[GRES+R5]/[R1+R2]$. In one embodiment, the magnitude of the DC gain provided by the first gain path is substantially higher than a magnitude of the AC gain provided by the second gain path.

In addition to the use of voltage mode amplifier 210, the settings of the passive components R1, R2, R3, GRES, R4, R5 and GCAP are chosen so as to ensure large DC gain and low high frequency gain to improve overall system accuracy of generating the output voltage 123 at a desired setpoint or within a desired voltage range. Such a configuration also avoids instability.

Thus, the reference voltage generator 110 includes a floor reference voltage amplifier 210 operative to produce the floor reference voltage 115. The adjustable resistor-capacitor path 109-2 (series combination of R5, GRES, and GCAP) is disposed in a feedback path of the floor reference voltage amplifier 210. In one embodiment, the adjustable resistor-capacitor path 109-2 controls a gain such as an AC (Alternating Current) gain of the floor reference voltage amplifier 210. Thus, variations in the adjustable resistor-capacitor path 109-2 (such as settings of capacitor or resistors) result in variations to the corresponding gain provided by the adjustable resistor-capacitor path 109-2.

In accordance with further example embodiments, the floor reference voltage generator 110 includes adjustable resistor-capacitor path 109-1 (such as a zero circuit) disposed in a circuit path between an output node of a sense amplifier stage 360 (producing signal 219) and an input of the floor reference voltage amplifier 110. As previously discussed, in one embodiment, the sense amplifier stage 360 compares the output voltage feedback signal 192 to a reference setpoint voltage provided by device 291. Based on the comparison, the sense amplifier 360 generates signal 219 (such as an error voltage signal, potentially offset by a fixed value such as 600 mVDC).

The sense amplifier 360 inputs the respective generated signal 219 into the circuit path (adjustable resistor-capacitor path 109-1) to the floor reference voltage amplifier 210. In one embodiment, the adjustable resistor-capacitor path 109-1 provides a zero to the reference voltage generator 210 for stability purposes. A programmed setting of the adjustable resistor-capacitor path 109-1 (such as RC value for capacitor ZCAP and resistor ZRES) provides and controls a setting of a zero associated with the floor reference voltage generator 110.

In one embodiment, the adjustable resistor-capacitor path 109-2 receives a ripple voltage (such as from the sense amplifier stage 360) and provides a zero compensation to the floor reference voltage amplifier 210 in the floor reference voltage generator 110 for stability.

As previously discussed, during operation in the diode emulation mode, the reference voltage 113 produced by reference generator 143 is coupled to the inverting input of the amplifier 220 via closed switch SW3. As further shown, the non-inverting input of the amplifier 220 is connected to receive the floor reference voltage 115.

In one embodiment, to operate the floor reference voltage generator 110 during the diode emulation mode, the controller 140 sets each of the switches SW1 and SW3 to an ON state (closed, providing very low resistive path) and switch SW2 to an OFF state (open, providing a high resistive path). In such an instance, the signal 246 outputted from the amplifier 220 to node 328 overrides the input voltage to resistor R1 such that the floor reference voltage generator 610 produces the floor reference voltage 115 to be equal to a fixed value such as 550 mVDC or other suitable value. As shown, the non-inverting input of amplifier 210 is set to 600 mVDC or other suitable value.

In accordance with further embodiments, to operate the floor reference voltage generator 110 in the continuous conduction mode (in which a magnitude of the floor reference voltage 115 varies), the controller 140 sets each of the switches SW1 and SW3 to an OFF state (opened, providing very high resistive path) and switch SW2 to an ON state (closed, providing a low resistive path). In such an instance, the amplifier 220 no longer drives a feedback path (specifically node 328) of the floor reference voltage generator 110. Instead, the amplifier 220 is set to operate in a unity gain mode in which the output of the amplifier 220 follows (tracks) the floor reference voltage 115 inputted to the non-inverting input of amplifier 220. As previously discussed, in the unity gain mode, closed switch SW2 connects the output of the amplifier 220 to the inverting input of the amplifier 220. Open switch SW1 ensures that the output of the amplifier 220 does not drive node 328 between resistor R2 and resistor R3.

Thus, in the continuous conduction mode, the output of the amplifier 220 is disconnected from driving the feedback path (such as node 328 or resistor R4) of floor reference voltage generator 110. In such an instance, the amplifier 210 produces the floor reference voltage 115 based upon variations in the magnitude of the output voltage feedback signal 192 with respect to the setpoint 288 as sensed by sense amplifier 360.

Note further that, when the mode controller 140 switches back to operating in the diode emulation mode of operation in which the reference generator 143 controls a magnitude of the floor reference voltage 115, the amplifier 220 produces at least initially drives the node 328 between resistor R2 and resistor R3 with the previously tracked voltage value of the amplifier 220 while it was previously set to the unity gain mode. As previously discussed, in the diode emulation mode, the amplifier 220 causes the floor reference voltage generator 110 to drive the floor reference voltage 115 in accordance with the reference signal 113 outputted from the reference generator 143.

In accordance with further embodiments, regardless of the selected floor reference voltage generator mode, comparator 260 compares the received output voltage feedback signal 192 to the smaller magnitude of the floor reference voltage 115 and soft start reference 195 to produce output control 165. As further discussed below, the control output 165 controls one or more switches in the voltage converter 135 in FIG. 6 to convert the input voltage into a respective output voltage 123.

Figure 3:
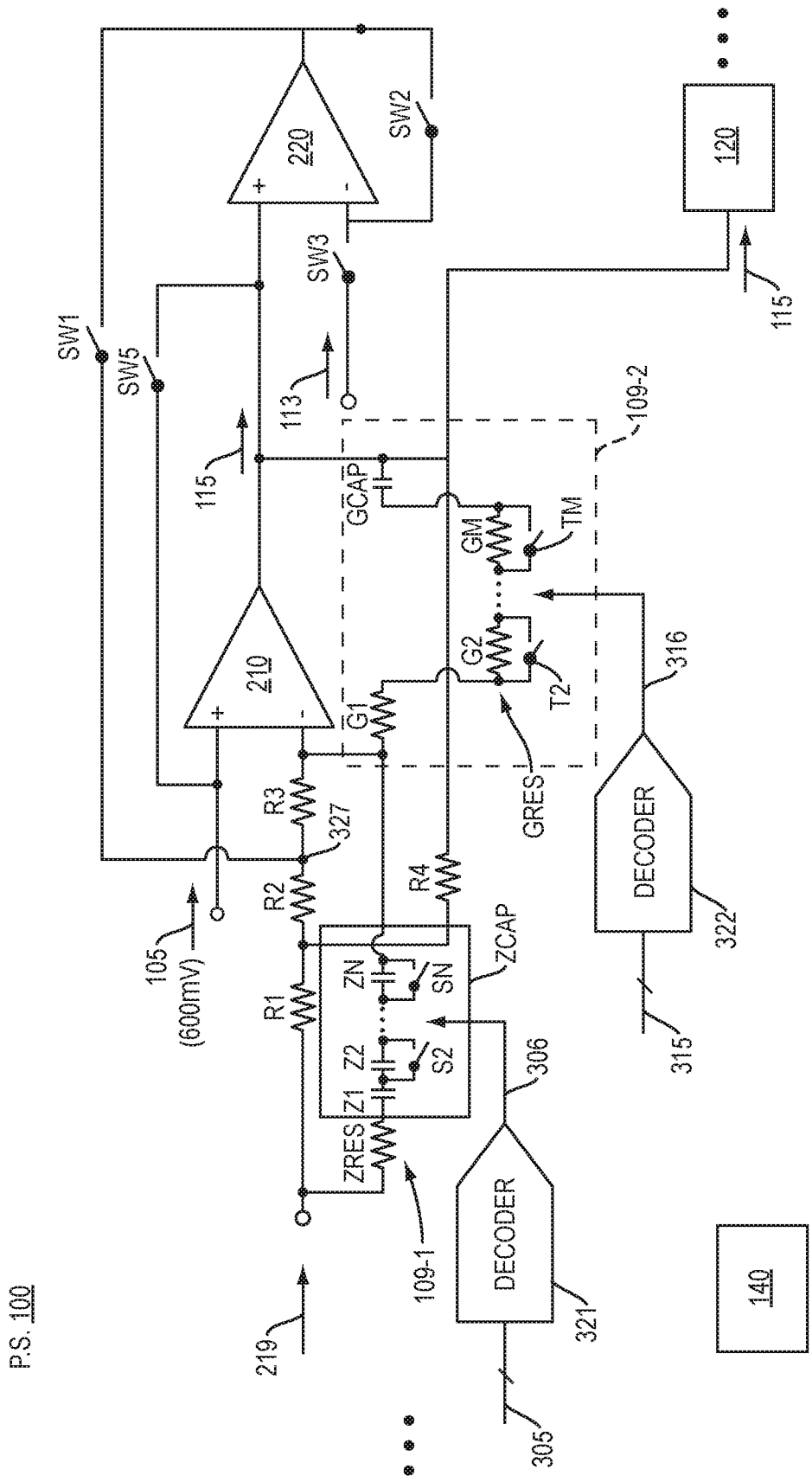
FIG. 3 is an example diagram illustrating a specific implementation of multiple adjustable resistor-capacitor paths in a floor reference voltage generator according to embodiments herein.

FIG. 3 is an example diagram illustrating a specific implementation of multiple adjustable resistor-capacitor paths according to embodiments herein.

In this example embodiment, the capacitor ZCAP is implemented as a capacitor ladder including capacitor Z1, Z2, . . . ZN. The controller 140 (or other suitable entity) produces control signal 305 (such as a digital string of data bit information) indicating how to set the capacitor ZCAP in the adjustable resistor-capacitor path 109-1. Decoder 321 decodes the control signal 305 into control signal 306, which controls settings of the switches S2, . . . , SN. Control of switches S2, S3, . . . SN, determines a magnitude of the capacitor ZCAP based on how many capacitors Z1, Z2, etc., of the capacitor ladder are connected in series or parallel. The combination of the capacitor ZCAP and resistor ZRES (such as a fixed or adjustable value) controls settings of the respective adjustable resistor-capacitor path 109-1 (zero circuit).

Note that the configuration of the adjustable resistor-capacitor path 109-1 in FIG. 3 is shown by way of a non-limiting example embodiment only. Note that either or both of the components (such as capacitor ZCAP or resistor ZRES) can be programmed to desired resistance or capacitance values to provide a desired circuit behavior (response) based on respective control signals from controller 140.

Thus, in one embodiment, the adjustable resistor-capacitor path 109-1 can be configured to include a capacitor ladder (multiple capacitors). The power supply further includes a first RC (resistor-capacitor) path controller 140 (and/or decoder 321) that controls a capacitance of the capacitor ladder (such as capacitor ZCAP) in the adjustable resistor-capacitor path 109-1 to a desired capacitance setting. The first RC path controller (such as controller 140 and/or decoder 321) selects how many of the one or more capacitors (Z1, Z2, etc.) of the capacitor ladder are connected in parallel or series depending on a respective control signal 306 inputted to the capacitor ladder. Via changes in the number of capacitors of the capacitor ladder that are connected in parallel or series, the first RC path controller controls a capacitance setting and the overall RC setting of the adjustable resistor-capacitor path 109-1 and corresponding circuit behavior (response) associated with the floor reference voltage generator 110.

Further in this non-limiting example embodiment, the resistor GRES is implemented as a resistor ladder including resistor G1, G2, . . . GM. The controller 140 (or other suitable entity) produces control signal 315 (such as a digital string of data bit information) indicating how to set the resistor GRES in the adjustable resistor-capacitor path 109-2. Decoder 322 decodes the control signal 315 into control signal 316, which controls settings of the switches T2, . . . , TM. Control of switches T2, . . . , TM determines a magnitude of the resistor GRES based on how many resistors G1, G2, G3, etc., of the resistor ladder are connected in series or parallel. The combination of the resistor GRES and capacitor GCAP controls AC gain settings of the respective adjustable resistor-capacitor path 109-2 (gain control circuit).

Note that the configuration of the adjustable resistor-capacitor path 109-2 in FIG. 3 is shown by way of a non-limiting example embodiment only. Either or both of the components (such as resistor GRES or capacitor GCAP) can be programmed to desired resistance or capacitance values to provide a desired circuit behavior based on respective control signals 315 from controller 140.

Thus, in one embodiment, the adjustable resistor-capacitor path 109-2 includes a resistor ladder (such as resistor GRES including multiple resistors G1, G2, G3, etc.). The power supply 100 further includes a second RC (resistor-capacitor) path controller (such as controller 140 and/or decoder 322) that controls a resistance of the resistor ladder in the adjustable resistor-capacitor path 109-2 to a desired resistor setting. The second RC path controller selects how many of the one or more resistors of the resistor ladder are connected in parallel depending on a respective control signal 316 inputted to the resistor ladder. Via changes in the number of resistors of the resistor ladder that are connected in series or parallel, the second RC path controller controls a resistance setting and thus overall RC setting of the adjustable resistor-capacitor path 109-2 and corresponding circuit attributes associated with the floor reference voltage generator 110.

In accordance with further example embodiments, the power supply 100 (such as an integrated circuit or other suitable form) includes a digital state machine 202 that automatically tunes a respective setting of each of the one or more adjustable resistor-capacitor paths 109 based on one or more parameters such as:

1) ON time selection/switching frequency of operating the voltage 135. For example, in one embodiment, a user implementing power supply 100 selects a preferred switching frequency (E.g. 800 kHz, 1 MHz, 2 MHz . . . ) of operating the voltage converter 135 within a predefined range of values by connecting one pin of the power supply 100 to an external resistor RCTL. In such an instance, the controller 140 determines a setting (resistance value) of the external resistor RCTL and, based on the resistance value, the digital state machine 202 then sets up the optimal resistor-capacitor values for the respective adjustable resistor-capacitor paths 109.

2) An output current 297 supplied by the output voltage 123 to the load 118. For example, the controller 140 measures current 297 and maps the detected output current 297 to an appropriate setting of the respective adjustable resistor-capacitor path.

3) IC (Integrated Circuit) temperature. In one embodiment, the power supply 100 and corresponding one or more components are disposed in an integrated circuit (such as semiconductor chip or other suitable entity). The controller 140 measures a temperature of a component such as of the chip, adjustable resistor-capacitor path, etc., and selects an appropriate setting based on the detected temperature. In one embodiment, there is an optimal setting of resistor-capacitor combination based on measured temperature.

In accordance with further example embodiments, the digital state machine 202 generates control signals 305 and 315 to control settings of the adjustable resistor-capacitor paths as further discussed below in FIG. 3.

Figure 4:
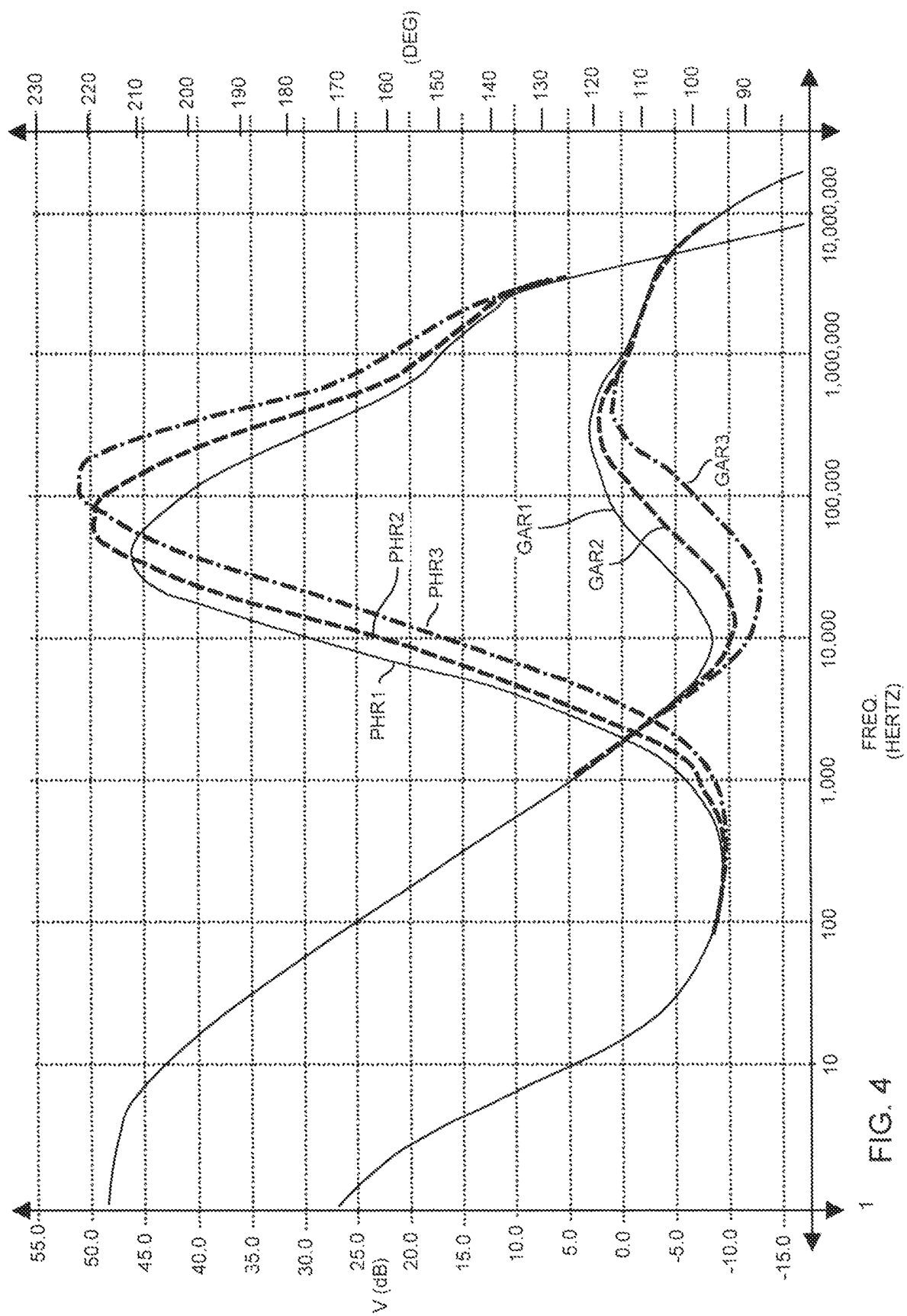
FIG. 4 is an example diagram illustrating a transfer function (phase and gain responses) associated with the floor reference voltage generator for different zero settings of a respective adjustable resistor-capacitor path in a floor reference voltage generator according to embodiments herein.

FIG. 4 is an example diagram illustrating a transfer function associated with the floor reference voltage generator for different zero settings of a respective adjustable resistor-capacitor path according to embodiments herein according to embodiments herein.

In this example embodiment, assume that the adjustable resistor-capacitor path 109-2 is set to a first programmed setting. Selection of the setting associated with the adjustable resistor-capacitor path 109-1 (zero circuit) provides a first circuit response. For example, for a first programmed setting of the adjustable resistor-capacitor path 109-1 (such as resistor ZRES set to a fixed value and capacitor ZCAP set to a first capacitance value), the floor reference voltage generator 110 has a phase response PHR1 and gain response GAR1.

As previously discussed, the adjustable resistor-capacitor path 109-1 can be adjusted (programmed) to provide a different circuit behavior (such as transfer function, gain response, phase response, etc.). That is, changing the capacitance associated with the capacitor ZCAP provides a different phase/gain response for the floor reference voltage generator 210. As a more specific example, for a second programmed setting of the adjustable resistor-capacitor path 109-1 (such as resistor ZRES set to a fixed value and capacitor ZCAP set to a second capacitance value greater than the first capacitance value), the floor reference voltage generator 110 has a phase response PHR2 and gain response GAR2.

Changing the capacitance associated with the capacitor ZCAP provides yet a different phase/gain response. As a more specific example, for a third programmed setting of the adjustable resistor-capacitor path 109-1 (such as resistor ZRES set to a fixed value and capacitor ZCAP set to a third capacitance value greater than the second capacitance value), the floor reference voltage generator 110 has a phase response PHR3 and gain response GARS.

In this manner, the adjustable resistor-capacitor path 109-1 can be adjusted to any suitable value and provide a desired response.

Figure 5:
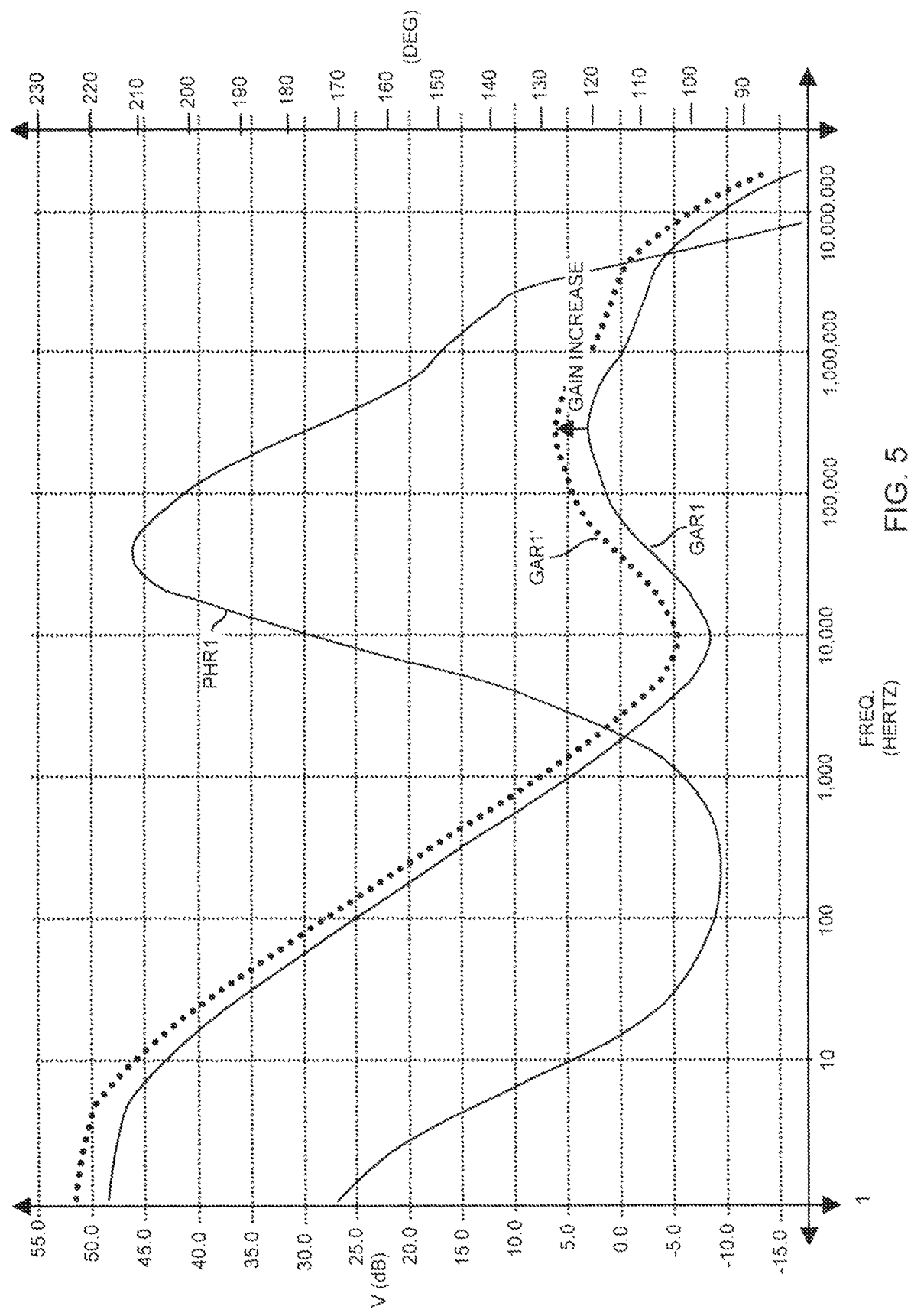
FIG. 5 is an example diagram illustrating a transfer function (phase and gain responses) associated with a floor reference voltage generator and implementation of an AC gain adjustment provided via control of a corresponding adjustable resistor-capacitor path according to embodiments herein according to embodiments herein.

FIG. 5 is an example diagram illustrating a transfer function associated with implementation of an AC gain adjustment provided via control of a corresponding adjustable resistor-capacitor path according to embodiments herein according to embodiments herein.

Note that the first (or any) programmed setting of the adjustable resistor-capacitor path 109-2 in FIG. 4 can be adjusted to provide higher or lower gain between the input and output of the floor reference voltage generator 110. For example, as shown in FIG. 5, an increase in a resistance GRES associated with the adjustable resistor-capacitor path 109-2 results in an increase in AC gain provided by the floor reference voltage generator 110.

More specifically, a combination of setting the adjustable resistor-capacitor path 109-2 to the first programmed setting as previously discussed and selection of the setting associated with the adjustable resistor-capacitor path 109-1 (zero circuit) as previously discussed provides a first circuit response (phase response PHR1 and gain response GAR1. Increasing a magnitude of the resistance associated with the resistor GRES of the adjustable resistor-capacitor path 109-2 (via corresponding reprograming) provides an increased gain as indicated by gain response GAR1'. In other words, if desired, the original gain response GAR1 and phase response PHR1 can be tweaked to gain response GAR1' and phase response PHR1 based on adjusting the adjustable resistor-capacitor path 109-2.

Thus, a combination of reprogramming settings associated with one or both of adjustable resistor-capacitor path 109-1 and adjustable resistor-capacitor path 109-2 enables the floor reference voltage generator 110 to provide any desired response.

Figure 6:
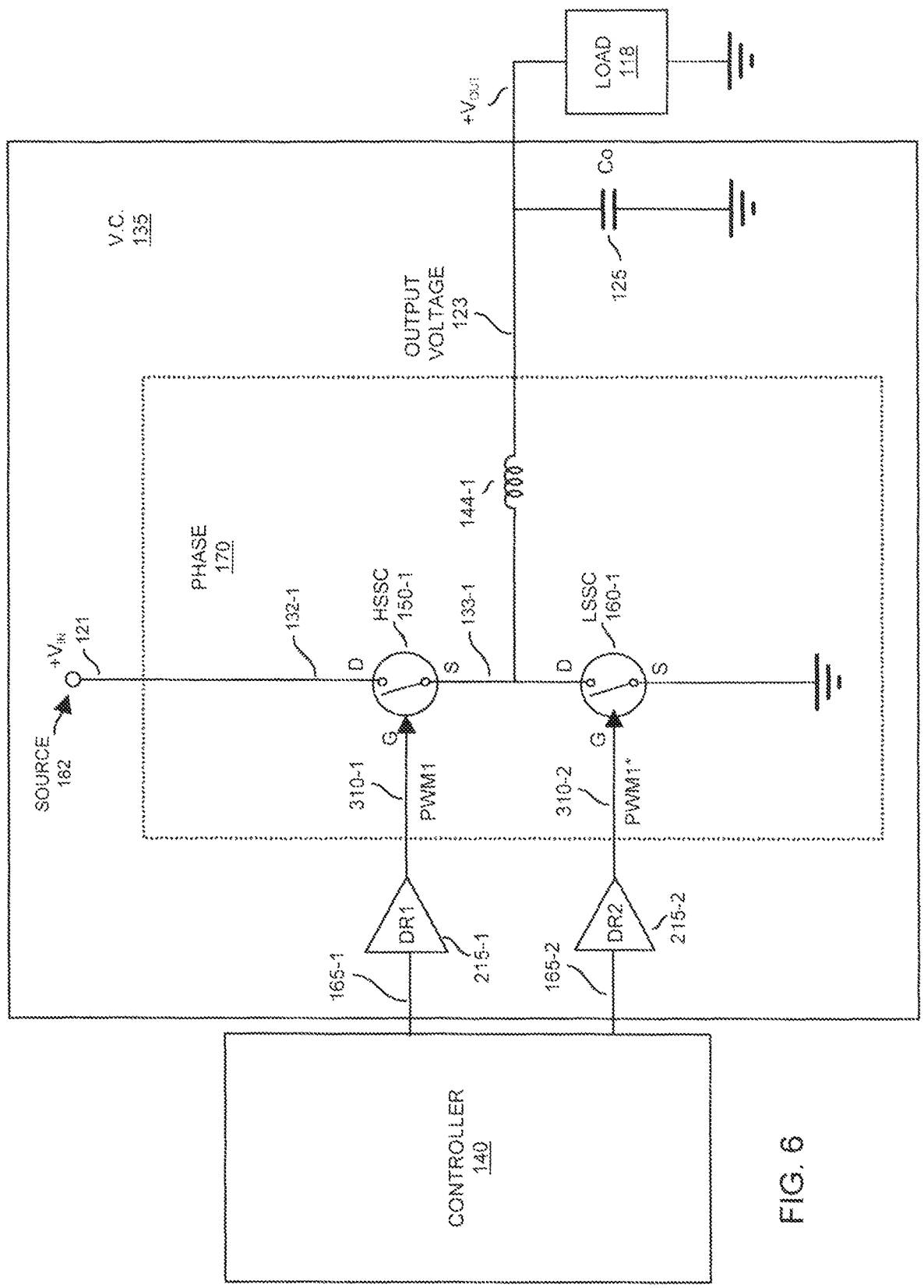
FIG. 6 is an example diagram illustrating implementation of a voltage converter according to embodiments herein.

FIG. 6 is an example diagram illustrating implementation of a voltage converter according to embodiments herein.

In one nonlimiting example embodiment, the voltage converter 135 is a DC-to-DC buck converter operative to produce the output voltage 123 from the input voltage 121. However, note that the voltage converter 135 can be implemented in any suitable manner according to embodiments herein.

As shown, the voltage converter 135 used to generate output voltage 123 includes driver circuitry 215-1, driver circuitry 215-2, high side switch circuitry 150-1 (such as a control switch or switches), low side switch circuitry 160-1 (such as a synchronous switch or switches), controller circuitry 240 and inductor 144-1. Control output 165-1 and 165-2 produced by the controller 140 serves as a basis to control high side switch circuitry 150-1 and low side switch circuitry 160-1.

Note that switch circuitry 150-1, 160-1 can be any suitable type of switch resource (field effect transistors, bipolar junction transistors, etc.). In one embodiment, each of the high side switch circuitry 150-1 and low side switch circuitry 160-1 are power MOSFET (Metal Oxide Semiconductor Field Effect Transistor) or other suitable switch devices.

Appropriate switching of the high side switch circuitry 150-1 and the low side switch circuitry 160-1 results in generation of the output voltage 123 as is known in a conventional DC-DC converter such as a buck converter.

Further in this example embodiment, note that the voltage converter 135 receives control output 165 from controller 140 and, on this basis, controls the driver circuitry 215-1 and driver circuitry 215-2 to produce a PWM1 control signal 310 (PWM1) to control high side switch circuitry 150-1 and corresponding PWM1* control signal to control low-side switch circuitry 160-1.

In general, during continuous conduction mode operation of the voltage converter 135, the low side switch circuitry 160-1 is activated (closed or ON state, low impedance path from drain to source) when the high side switch circuitry 150-1 is deactivated (open or OFF state, high impedance path from drain to source), and vice versa. There is a dead time between a transition of activating high side switch circuitry 150-1 to activating low side switch circuitry 160-1.

There is a dead time between a transition of activating low side switch circuitry 160-1 to activating high side switch circuitry 150-1.

On the other hand, during diode emulation mode, the high side switch circuitry 150-1 is repeatedly pulsed ON and OFF while low side switch circuitry 160-1 is constantly deactivated (OFF or open circuit).

As previously discussed, the controller 140 (of FIG. 1) can be configured to compare the (floor) reference voltage 115 and the output voltage feedback signal 192 to determine a timing of activating high side switch circuitry 150-1 of the respective voltage converter 135 to an ON (closed switch) state.

In one embodiment, the floor reference voltage 115 or offset ramp reference voltage 125 serves as a threshold value. In such an instance, when the magnitude of the output voltage feedback signal 192 is equal to, crosses, or falls below a magnitude of the offset ramp reference voltage signal 125, the controller 140 produces the control signals 165 to turn ON the high side switch circuitry 150-1 (at which time the low side switch circuitry 160-1 is turned OFF).

Note further that the power supply 100 and corresponding voltage converter 135 can be operated in a so-called constant ON-time control mode in which the PWM (Pulse Width Modulation) setting of the ON-time of control pulses (such as control signal 165-1) of switch circuitry (such as high side switch circuitry 150-1) in a phase is constant or fixed; the OFF time of high side switch circuitry 150-1 varies depending upon a subsequent cycle of comparing the output voltage feedback signal 192 and issuance of pulsing the high side switch circuitry 150-1 ON again via subsequent generate fixed pulse width switch control signals. As the rate of decay of the magnitude of the output voltage 123 slows over time, the frequency of pulsing the high side switch circuitry 150-1 ON again decreases. Conversely, as the rate of decay of the magnitude of the output voltage 123 increase over time, the frequency of pulsing the high side switch circuitry 150-1 ON again increases.

Thus, in the constant ON-time control mode in which the ON-time of activating the high side switch circuitry 150-1 is a fixed or predetermined value, the frequency of activating the high side switch varies to maintain the output voltage 123 to a desired set point.

Figure 7:
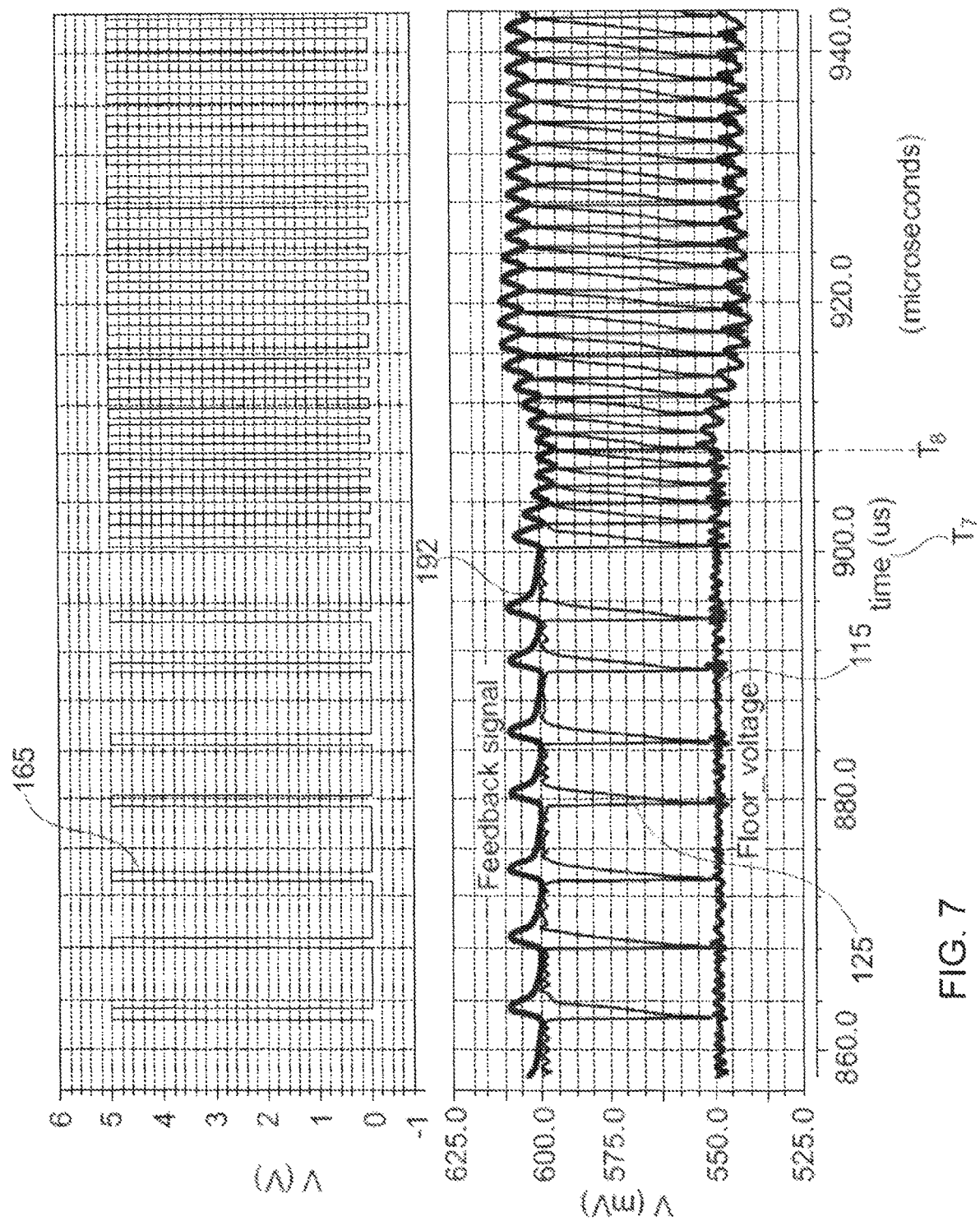
FIG. 7 is an example diagram illustrating different operation of a power supply in a fixed floor reference voltage mode and variable floor reference voltage mode according to embodiments herein.

FIG. 7 is an example timing diagram illustrating switchover from operating in a diode emulation mode (discontinuous conduction mode, fixed floor reference voltage mode, diode emulation mode) to operating in a continuous conduction mode (variable floor reference voltage mode) according to embodiments herein.

As shown in FIG. 7, during diode emulation mode during which the load 118 consumes a small amount of current (below a threshold value) prior to time T7, the voltage converter 135 operates in a discontinuous conduction mode (also known as diode emulation mode). In this mode, due to low or no current consumption by the load 118, the magnitude of the output voltage feedback signal 192 can remain above the regulation reference and offset ramp voltage signal 125 for a significant amount of time without activating the high side switch circuitry 150-1 again. As previously discussed, low side switch circuitry 160-1 is not activated in the diode emulation mode (such as prior to time t7, which corresponds to 900 microseconds). Optionally, as in the configuration shown, the offset ramp reference voltage signal 125 is clamped a voltage value such as 600 millivolts. Accordingly, the offset ramp voltage signal 125 is cyclical; each cycle of the ramp voltage signal 125 has a monotonous portion during which the ramp voltage signal increases or decreases, and a clamped portion in which a magnitude of the ramp voltage signal is substantially constant (such as 600 millivolts).

One embodiment herein includes, via controller 140, monitoring a parameter such as the amount of current (direct measurement, emulated current, etc.) delivered to the load via the output voltage 123. During a condition in which a monitor circuit (such as controller 140) detects that the supplied current such as current through the inductor 144-1 is below a threshold value, or when the current is negative flowing from capacitor 125 through inductor 144-1 to node 133-1 (FIG. 6), the controller 140 operates power supply 100 in the diode emulation mode (adjustable floor voltage mode or mode #1) during which switches SW1 and SW3 are closed and switch SW2 is open (see FIG. 2).

In a manner as previously discussed, operation in the adjustable voltage floor mode (continuous conduction mode after time T8) causes the floor reference voltage 115 to be adjusted to a suitable voltage value such that an average magnitude of the output voltage 123 is substantially equal to a desired setpoint voltage as controlled by setpoint 288.

When the controller 140 detects that the load 118 consumes substantial current from the generated output voltage 123 again, such as above a threshold value amount of current or a voltage droop of the output voltage 123 below a threshold value occurs, the controller 140 switches to operating in the variable floor mode (mode #2, continuous conduction mode) during which switches S1 and S3 are opened and switch S2 is closed.

Subsequent to detecting occurrence of one or more conditions such as an increase in current consumption or droop in the magnitude of the output voltage 123 below a threshold value at, around, or for a duration of time before time T8, which corresponds to 908 microseconds, controller 140 switches over to operating the floor reference voltage generator 110 in the so-called variable (active) floor mode (mode #2, continuous conduction mode) in which the floor reference voltage 115 varies depending on the magnitude of the output voltage 191 (or an output voltage feedback signal 192).

Thus, after time T8 as shown in timing diagram 700, when the load 118 consumes substantial current from the output voltage 123, the voltage converter 135 produces the output control 165 (or PWM signal 310) to more frequently activate high side switch circuitry 150-1 for the constant ON time pulse durations to maintain the output voltage 123 within a desired range.

In one embodiment, regulation of the output voltage feedback signal 192 at or around 600 mVDC indicates that the output voltage 123 is within a desired regulation. If the magnitude of the output voltage 123 falls below a desired voltage regulation setpoint, the magnitude of the floor reference voltage 115 increases above 550 mVDC; if the magnitude of the output voltage 123 raises above the desired voltage regulation setpoint, the magnitude of the floor reference voltage 115 decreases below 550 mVDC. At steady state, the floor reference voltage 115 is approximately steady at around 540 mVDC.

Figure 8:
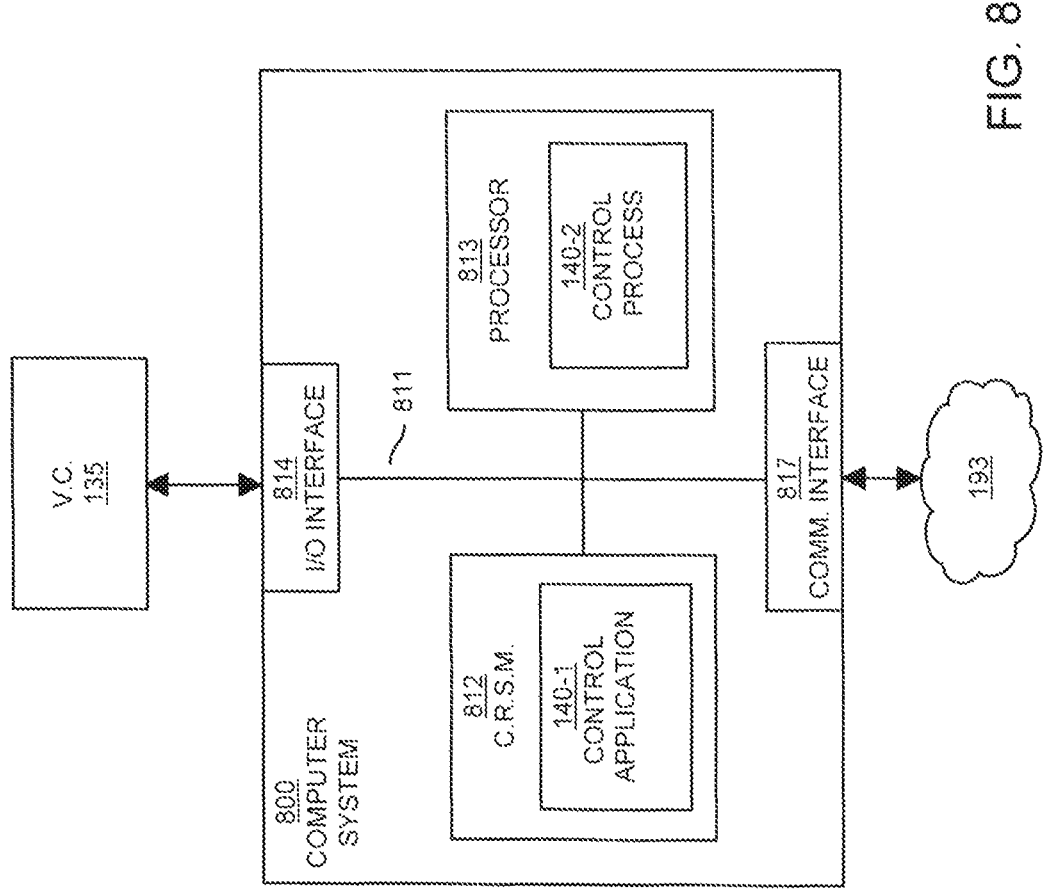
FIG. 8 is an example diagram illustrating computer processor hardware and related software instructions or logic circuit operative to execute methods according to embodiments herein.

FIG. 8 is an example block diagram of a computer device for implementing any of the operations as discussed herein according to embodiments herein.

As shown, computer system 800 (such as implemented by any of one or more resources such as controller 140, etc.) of the present example includes an interconnect 811 that couples computer readable storage media 812 such as a non-transitory type of media (or hardware storage media) in which digital information can be stored and retrieved, a processor 813 (e.g., computer processor hardware such as one or more processor devices), I/O interface 814, and a communications interface 817.

I/O interface 814 provides connectivity to any suitable circuitry such as each of phases 110.

Computer readable storage medium 812 can be any hardware storage resource or device such as memory, optical storage, hard drive, floppy disk, etc. In one embodiment, the computer readable storage medium 812 stores instructions and/or data used by the control application 140-1 to perform any of the operations as described herein.

Further in this example embodiment, communications interface 817 enables the computer system 800 and processor 813 to communicate over a resource such as network 193 to retrieve information from remote sources and communicate with other computers.

As shown, computer readable storage media 812 is encoded with control application 140-1 (e.g., software, firmware, etc.) executed by processor 813. Control application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in control application 140-1 stored on computer readable storage medium 812.

Execution of the control application 140-1 produces processing functionality such as control process 140-2 in processor 813. In other words, the control process 140-2 associated with processor 813 represents one or more aspects of executing control application 140-1 within or upon the processor 813 in the computer system 800.

In accordance with different embodiments, note that computer system 800 can be a micro-controller device, logic, hardware processor, hybrid analog/digital circuitry, etc., configured to control a power supply and perform any of the operations as described herein.

Functionality supported by the different resources will now be discussed via flowchart in FIG. 9. Note that the steps in the flowcharts below can be executed in any suitable order.

Figure 9:
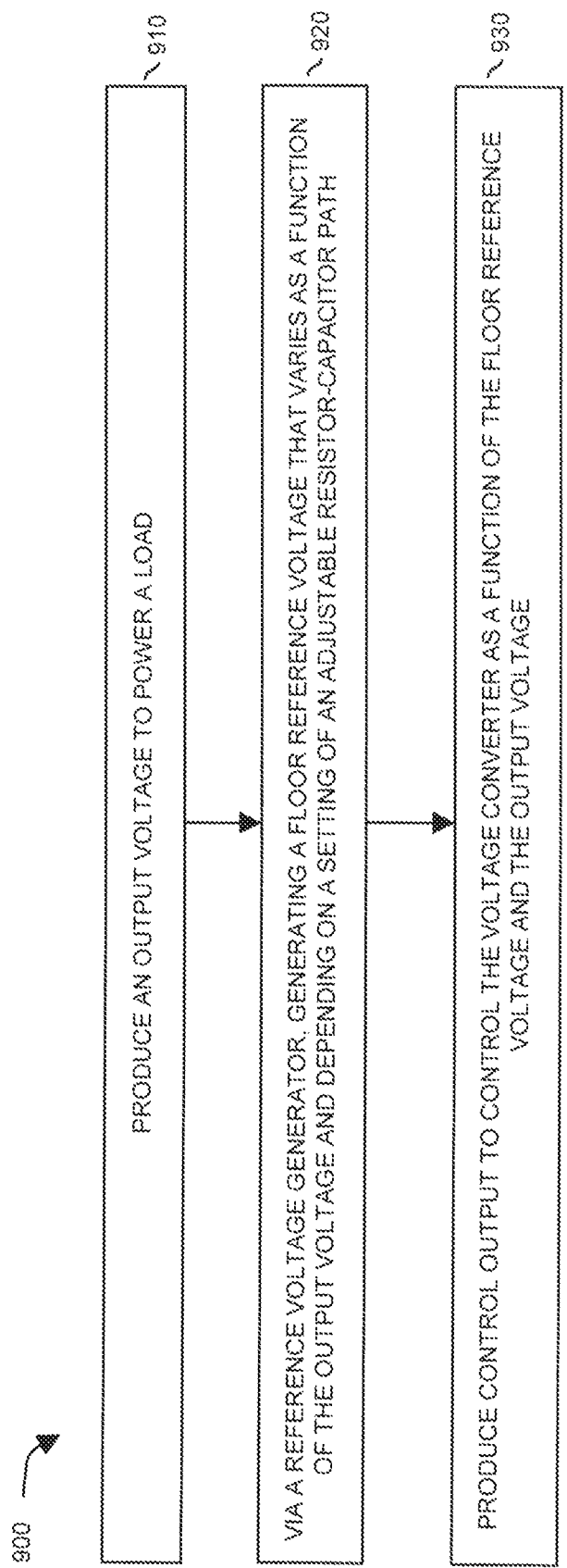
FIG. 9 is an example diagram illustrating a method according to embodiments herein.

FIG. 9 is an example diagram illustrating a method of providing compensation in a power converter according to embodiments herein.

In processing operation 910, the voltage converter 135 produces an output voltage 123 to power a load 118.

In processing operation 920, the floor reference voltage generator 210 generates a floor reference voltage 115 that varies as a function of the output voltage 123 (and/or a derivative of the output voltage 123 such as output voltage feedback signal 192) and depending on a setting of an adjustable resistor-capacitor path 109.

In processing operation 930, the controller 140 produces control output to control the voltage converter 135 as a function of the floor reference voltage 115 and the output voltage 123 (or output voltage feedback signal 192 derived from the output voltage 123).

Figure 10:
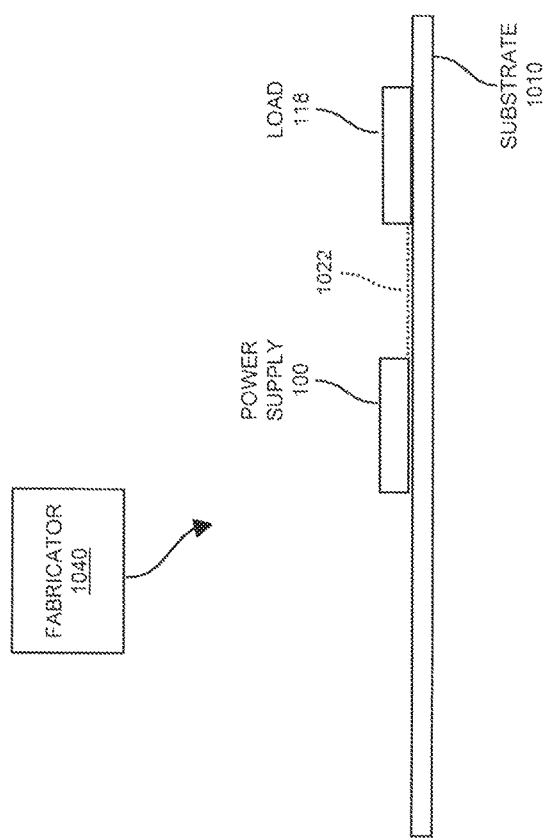
FIG. 10 is an example diagram illustrating fabrication of a power converter circuit according to embodiments herein.

FIG. 10 is an example diagram illustrating fabrication of a power converter circuit on a circuit board according to embodiments herein.

In this example embodiment, fabricator 1040 receives a substrate 1010 (such as a circuit board).

The fabricator 1040 further affixes the power supply 100 (and corresponding components) to the substrate 1010. Via circuit path 1022 (such as one or more traces, etc.), the fabricator 1040 couples the power supply 100 to the load 118. In one embodiment, the circuit path 1022 conveys the output voltage 123 generated from the power supply 100 to the load 118. Via the power supply 100 and corresponding components, the power supply 100 converts a received input voltage 121 into a respective output voltage 123 that drives load 118.

Accordingly, embodiments herein include a system comprising: a substrate 1010 (such as a circuit board, standalone board, mother board, standalone board destined to be coupled to a mother board, etc.); a power supply 100 including corresponding components as described herein; and a load 118. As previously discussed, the load 118 is powered based on conveyance of output voltage 123 and corresponding current 131 conveyed over circuit path 1022 from the power supply 100 to the load 118.

Note that the load 1518 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1010 or disposed at a remote location.

Note again that techniques herein are well suited for use in circuit applications such as those that implement power conversion. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;
a controller to produce control output to control the voltage converter as a function of the floor reference voltage and the output voltage; and
wherein the adjustable resistor-capacitor path provides a setting of a zero associated with the floor reference voltage generator.

2. The power supply as in claim 1 further comprising:
a ramp voltage generator operative to produce a ramp voltage, the ramp voltage being offset by the floor reference voltage; and
wherein the controller is operative to produce the control output based on a comparison of the output voltage to the offset ramp voltage.

3. The power supply as in claim 1, wherein the floor reference voltage generator includes a floor reference voltage amplifier operative to produce the floor reference voltage; and
wherein the adjustable resistor-capacitor path is disposed in a feedback path of the floor reference voltage amplifier.

4. The power supply as in claim 3, wherein the adjustable resistor-capacitor path is operative to control a gain response associated with generating the floor reference voltage.

5. The power supply as in claim 3, wherein the adjustable resistor-capacitor path is operative to control a phase and gain associated with the floor reference voltage amplifier.

6. The power supply as in claim 1, wherein the adjustable resistor-capacitor path controls a phase response associated with the floor reference voltage generator.

7. A system comprising:
a circuit substrate; and
the power supply of claim 1, the power supply fabricated on the circuit substrate.

8. A method comprising:
receiving a circuit substrate; and
fabricating the power supply of claim 1 on the circuit substrate.

9. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;
a controller to produce control output to control the voltage converter as a function of the floor reference voltage and the output voltage;
wherein the floor reference voltage generator includes a floor reference voltage amplifier operative to produce the floor reference voltage;
wherein the adjustable resistor-capacitor path is disposed in a feedback path of the floor reference voltage amplifier; and
wherein the adjustable resistor-capacitor path is operative to control an AC (Alternating Current) gain of the floor reference voltage amplifier.

10. The power supply as in claim 9, wherein the adjustable resistor-capacitor path provides a setting of a zero associated with the floor reference voltage generator.

11. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;
a controller to produce control output to control the voltage converter as a function of the floor reference voltage and the output voltage;
wherein the floor reference voltage generator includes a floor reference voltage amplifier operative to produce the floor reference voltage;
wherein the adjustable resistor-capacitor path is disposed in a circuit path between an output of a sense amplifier stage and an input of the floor reference voltage amplifier; and
wherein the sense amplifier stage is operative to input an error voltage signal into the circuit path to the floor reference voltage amplifier.

12. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;
a controller to produce control output to control the voltage converter as a function of the floor reference voltage and the output voltage; and
wherein the adjustable resistor-capacitor path includes a capacitor ladder, the power supply further comprising:
a controller operative to control a capacitance of the capacitor ladder to a desired capacitance setting.

13. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;
a controller to produce control output to control the voltage converter as a function of the floor reference voltage and the output voltage; and
wherein the adjustable resistor-capacitor path includes a resistor ladder, the power supply further comprising:
a controller operative to control a resistance of the resistor ladder to a desired resistance setting.

14. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;

a controller to produce control output to control the voltage converter as a function of the floor reference voltage and the output voltage; and wherein a magnitude of the floor reference voltage varies depending on an error signal derived from comparing the output voltage to a reference voltage.

15. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;
a controller to produce control output to control the voltage converter as a function of the floor reference voltage and the output voltage; and
wherein the adjustable resistor-capacitor path receives a ripple voltage and provides zero compensation to a floor reference voltage amplifier in the floor reference voltage generator.

16. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;
a controller to produce control output to control the voltage converter as a function of the floor reference voltage and the output voltage;
wherein the floor reference voltage generator includes a floor reference voltage amplifier operative to produce the floor reference voltage; and
wherein the adjustable resistor-capacitor path is a first adjustable resistor-capacitor path disposed in a feedback path of the floor reference voltage amplifier, the first adjustable resistor-capacitor path being operative to control an AC (Alternating Current) gain of the floor reference voltage amplifier, the power supply further comprising:
a second adjustable resistor-capacitor path providing a setting of a zero associated with the floor reference voltage generator.

17. A method comprising:
producing an output voltage to power a load;
via a floor reference voltage generator, generating a floor reference voltage that varies as a function of the output voltage and a setting of an adjustable resistor-capacitor path;
producing control output to control the voltage converter as a function of the floor reference voltage and the output voltage; and
wherein the setting of the adjustable resistor-capacitor path controls an AC (Alternating Current) gain of a floor reference voltage amplifier of the floor reference voltage generator.

18. The method as in claim 17 further comprising:
producing a ramp voltage, the ramp voltage being offset by the floor reference voltage; and
wherein producing the control output includes producing the control output based on a comparison of the output voltage to the offset ramp voltage.

19. The method as in claim 17 comprising:
receiving a control signal; and
via the control signal, controlling the setting of the adjustable resistor-capacitor path, the adjustable resistor-capacitor path disposed in a feedback path of the floor reference voltage amplifier.

20. The method as in claim 17 further comprising:
inputting an error voltage signal into the adjustable resistor-capacitor path of the floor reference voltage generator.

21. The method as in claim 17, wherein the adjustable resistor-capacitor path provides a setting of a zero associated with the floor reference voltage generator.

22. The method as in claim 17, wherein the setting of the adjustable resistor-capacitor path controls a phase response associated with the floor reference voltage generator.

23. The method as in claim 17, wherein the adjustable resistor-capacitor path includes a capacitor ladder, the method further comprising:
selecting the setting of the adjustable resistor-capacitor path via control of the capacitor ladder to a desired capacitance.

24. The method as in claim 17, wherein the adjustable resistor-capacitor path includes a resistor ladder, the method further comprising:
selecting the setting of the adjustable resistor-capacitor path via control of the resistor ladder to a desired resistance.

25. The method as in claim 17, wherein a magnitude of the floor reference voltage varies depending on an error signal derived from comparing the output voltage to a reference voltage.

26. The method as in claim 17 further comprising:
receiving a ripple voltage as input to the adjustable resistor-capacitor path, the adjustable resistor-capacitor path providing zero compensation to the floor reference voltage amplifier in the floor reference voltage generator.

27. The method as in claim 17, wherein the adjustable resistor-capacitor path is a first adjustable resistor-capacitor path disposed in a feedback path of the floor reference voltage amplifier of the floor reference voltage generator, the method further comprising:
via a setting applied to the first adjustable resistor-capacitor path, controlling an AC (Alternating Current) gain of the floor reference voltage amplifier; and
via a second adjustable resistor-capacitor path in the floor reference voltage generator, controlling a setting of a zero associated with the floor reference voltage generator.

28. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;
a controller to produce control output to control the voltage converter as a function of the floor reference voltage and the output voltage; and
wherein the setting of the adjustable resistor-capacitor path is automatically tuned by a digital state machine based on a selected switching frequency of operating the voltage converter.

29. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;

a controller to produce control output to control the voltage converter as a function of the floor reference voltage and the output voltage; and wherein the adjustable resistor-capacitor path provides zero compensation to a floor reference voltage amplifier in the floor reference voltage generator.

30. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;
a controller to produce control output to control the voltage converter as a function of the floor reference voltage and the output voltage; and
wherein the adjustable resistor-capacitor path is disposed between a first amplifier and a second amplifier.

31. The power supply as in claim 30, wherein a first node of the adjustable resistor-capacitor path is coupled to an output of the first amplifier; and
wherein a second node of the adjustable resistor-capacitor path is coupled to an inverting input node of the second amplifier.

32. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;
a controller to produce control output to control the voltage converter as a function of the floor reference voltage and the output voltage; and
wherein the adjustable resistor-capacitor path is disposed in parallel with a resistive element.

33. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;
a controller to produce control output to control the voltage converter as a function of the floor reference voltage and the output voltage; and
wherein the adjustable resistor-capacitor path receives a ripple voltage.

34. A power supply comprising:
a voltage converter to produce an output voltage to power a load;
a floor reference voltage generator operative to generate a floor reference voltage that varies as a function of the output voltage and a setting of an adjustable resistor-capacitor path in the floor reference voltage generator;
a controller to produce control output to control the voltage converter as a function of the floor reference voltage and the output voltage; and
wherein the floor reference voltage generator is configured to include a first gain path for DC signal gain and a second gain path for AC signal gain, the adjustable resistor-capacitor path providing an AC gain associated with a received signal.

35. The power supply as in claim 34, wherein the received signal is an error voltage signal.

36. The power supply as in claim 35, wherein the error voltage signal is offset by a voltage value.

\* \* \* \* \*